US012753100B2

(12) United States Patent
Yang et al.

(10) Patent No.: US 12,753,100 B2
(45) Date of Patent: Oct. 6, 2026

(54) DEVICE FOR INFLUENT DISTRIBUTION AND THICKENED SLUDGE FERMENTATION TO ENHANCE MSBR SYSTEM

(71) Applicant: CORSTAR ENVIRONMENTAL EQUIPMENT SHANGHAI LTD, Shanghai (CN)

(72) Inventors: Chester QiXing Yang, Shanghai (SH); Lei Shen, Shanghai (CN); Xinwei Sun, Shanghai (CN)

(73) Assignee: CORSTAR ENVIRONMENTAL EQUIPMENT SHANGHAI LTD, Shanghai (CN)

(*) Notice: Subject to any disclaimer, the term of this patent is extended or adjusted under 35 U.S.C. 154(b) by 409 days.

(21) Appl. No.: 18/387,057

(22) Filed: Nov. 6, 2023

(65) Prior Publication Data

US 2024/0076222 A1 Mar. 7, 2024

Related U.S. Application Data

(63) Continuation of application No. PCT/CN2022/125027, filed on Oct. 13, 2022.

(30) Foreign Application Priority Data

Sep. 5, 2022 (CN) ........................ 202211080104.9

(51) Int. Cl.
*C02F 11/04* (2006.01)
*C02F 3/00* (2023.01)
(Continued)

(52) U.S. Cl.
CPC ............ *C02F 11/04* (2013.01); *C02F 3/2866* (2013.01); *C02F 3/308* (2013.01); *C02F 3/006* (2013.01);
(Continued)

(58) Field of Classification Search
CPC ........ C02F 11/04; C02F 3/2866; C02F 3/308; C02F 3/006; C02F 3/1221; C02F 3/1263;
(Continued)

(56) References Cited

U.S. PATENT DOCUMENTS 5,228,996 A * 7/1993 Lansdell ................ C02F 3/301 210/624
5,354,471 A * 10/1994 Timpany .............. C02F 3/1263 210/201
5,942,108 A * 8/1999 Yang .................... C02F 3/1263 210/219

FOREIGN PATENT DOCUMENTS

BR 9710278 A * 8/1999 ............... C02F 3/30
CN 102776247 A * 11/2012
(Continued)

OTHER PUBLICATIONS

Machine-generated English translation of CN 216837333, generated on Feb. 10, 2026.*
(Continued)

*Primary Examiner* — Fred Prince
(74) *Attorney, Agent, or Firm* — Jose Cherson Weissbrot

(57) ABSTRACT

The present invention discloses a device for influent distribution and thickened sludge fermentation to enhance hydraulic impact resistance and nitrogen and phosphorus removal function of an MSBR system, which includes an influent distribution device, a hydrolysis and fermentation tank and an MSBR system connected thereto. The influent
(Continued)

distribution device, the hydrolysis and fermentation tank and the MSBR system are all connected to an external online control platform.

12 Claims, 5 Drawing Sheets

(51) Int. Cl.

| | |
|---|---|
| ***C02F 3/12*** | (2023.01) |
| ***C02F 3/28*** | (2023.01) |
| ***C02F 3/30*** | (2023.01) |
| ***C02F 11/12*** | (2019.01) |

(52) U.S. Cl.
CPC .......... *C02F 3/1221* (2013.01); *C02F 3/1263* (2013.01); *C02F 11/12* (2013.01); *C02F 2201/002* (2013.01); *C02F 2201/005* (2013.01); *C02F 2209/04* (2013.01); *C02F 2209/06* (2013.01); *C02F 2209/40* (2013.01); *C02F 2209/42* (2013.01); *Y02W 10/10* (2015.05)

(58) Field of Classification Search
CPC ................ C02F 11/12; C02F 2201/002; C02F 2201/005; C02F 2209/04; C02F 2209/06; C02F 2209/40; C02F 2209/42; Y02W 10/10
USPC ..... 210/605, 630, 903, 906, 195.3, 252, 259
See application file for complete search history.

(56) References Cited

FOREIGN PATENT DOCUMENTS

| | | | | |
|---|---|---|---|---|
| CN | 204417293 U | * | 6/2015 |
| CN | 215403640 U | | 1/2022 |
| CN | 216837333 U | | 6/2022 |

OTHER PUBLICATIONS

Machine-generated English translation of CN 102776247, generated on Feb. 10, 2026.*

Machine-generated English translation of BR 9710278, generated on Feb. 10, 2026.*

Machine-generated English translation of CN 110015812, generated on Feb. 10, 2026.*

Machine-generated English translation of CN 204417293, generated on Jun. 30, 2026.*

Zheping, S, et al., "Primary Sedimentation Pretreatment/Hydrolysis Acidification/MSBR Process for Treatment of Municipal Comprehensive Wastewater" , Environmental Science Design and Research Institute of Zhejiang Province Hang zhou 310007, China, vol. 26 , Issue 22 , pp. 43-47 , (Nov. 2010).

* cited by examiner

DEVICE FOR INFLUENT DISTRIBUTION AND THICKENED SLUDGE FERMENTATION TO ENHANCE MSBR SYSTEM

CROSS-REFERENCE TO RELATED APPLICATIONS

The present application is a continuation of International Application No. PCT/CN2022/125027, with an international filing date of Oct. 13, 2022, which is based upon and claims priority to Chinese Patent Application No. 202211080104.9, filed on Sep. 5, 2022, the entire contents of all of which are incorporated herein by reference.

FIELD OF TECHNOLOGY

The present invention relates to the technical field of sewage treatment, in particular to a device for influent distribution and thickened sludge fermentation to enhance an MSBR system.

BACKGROUND

In rainy season, sewage treatment plants are often faced with the problems of the heavy hydraulic impact load from rainwater and sewage and the lack of carbon sources in influent. Activated sludge treatment devices such as MSBRs are overloaded, causing severe reduction in reaction time and degree of treatment. The actual hydraulic load and solid load in the settling region far exceed the design values, which can easily cause a large loss of activated sludge and then system breakdown. The concentration and availability of organic carbon sources in the influent are important factors affecting the nitrogen and phosphorus removal effect of an MSBR system. In order to obtain reliable biological nitrogen and phosphorus removal effect, it is usually required that the influent COD/TKN should be at least 5 to 8 and COD/TP should be more than 40. The rapidly biodegradable COD (rbCOD) or short chain volatile fatty acids (SCVFAs) concentration in the influent are particularly critical. The ratio rbCOD/TP should be at least 18 to 20, or VFA/TP≥4 to 7, and the volatile fatty acid (VFA) concentration in the anaerobic region should be at least 25 mg/L.

However, the influent quality of most of the existing sewage treatment plants in China cannot meet the minimum requirements for relevant carbon sources, and further dilution of combined sewage under rainy season conditions will lead to the lack of carbon sources in the influent. In particular, the insufficient content of rbCOD or SCVFAs in influent is a serious constraint to the nitrogen and phosphorus removal capacity of the process. In order to improve the biological nitrogen and phosphorus removal efficiency of the MSBR system under large water quantity conditions in rainy season and discharge effluent with satisfactory total nitrogen (TN) and total phosphorus (TP), it is often required to strictly control the water inflow, add supplementary organic carbon sources such as glucose, sodium acetate and methanol, or add chemical phosphorus removal agents, which increases the operating cost of the sewage treatment plant, affects the operating stability of the system and exacerbates the pollution level of receiving waters.

The main improvement of the patent "Improved MSBR Process Sewage Treatment System" is the additional arrangement of a chemical dissolving tank and the addition of relevant chemicals to make the water quality meet the standard, but the problems of water inflow diversion and lack of carbon sources under heavy load are not mentioned.

The patent "Urban Sewage Treatment System and Process with Enhanced Nitrogen Removal" redesigns the functional regions of the MSBR. Its main improvement is the addition of a water inflow point in the pre-anoxic region, which makes the return sludge and the influent mixed rapidly, thereby achieving the anaerobic state. However, the problems of heavy hydraulic impact load and lack of carbon sources based on the MSBR are not mentioned.

SUMMARY

An object of the present invention is to provide a device for influent distribution and thickened sludge fermentation to enhance an MSBR system to overcome the defects in the prior art, which includes an influent distribution device, a hydrolysis and fermentation tank and an MSBR system connected thereto. The influent distribution device, the hydrolysis and fermentation tank and the MSBR system are all connected to an external online control platform.

The influent distribution device includes a distribution pipeline and related valves and meters and is configured to distribute a water inflow of the MSBR system. The hydrolysis and fermentation tank is provided with a stirrer therein and configured to stir sludge entering the tank. The hydrolysis and fermentation tank is externally connected with a feed pump and configured to input sludge in the MSBR system into the tank.

As a further description of the above technical solution, the influent distribution device includes: three pipelines, a middle part of each pipeline being provided with an electromagnetic flowmeter;

electric ball valves, each mounted at a water inlet at a front end of the electromagnetic flowmeter; and sludge concentration meters I.

As a further description of the above technical solution, the MSBR system includes an anaerobic unit, an aerobic unit, a first SBR unit and a second SBR unit. A bottom of the anaerobic unit is provided with a water inlet. The water inlet is connected to a middle pipeline of the influent distribution device. A bottom of the aerobic unit is also provided with a water inlet. The water inlet is connected to two side pipelines of the influent distribution device.

As a further description of the above technical solution, the sludge concentration meters I are respectively arranged inside the first SBR unit and the second SBR unit, and the first SBR unit and the second SBR unit are respectively connected with a sludge return pump.

As a further description of the above technical solution, the MSBR system further includes a sludge-water separation unit (18), a pre-anoxic unit (19), an anaerobic unit (10), a first anoxic unit and a second anoxic unit that are sequentially connected. The second anoxic unit is connected to the aerobic unit. The first SBR unit, the second SBR unit and the sludge-water separation unit are connected through the sludge return pump, and a first anoxic/aerobic unit and a second anoxic/aerobic unit are connected to the aerobic unit.

As a further description of the above technical solution, a shell of the hydrolysis and fermentation tank is provided with an opening of a sludge concentration meter 11, an opening of an ORP meter, an opening of a pH meter, an opening of a thermometer and an opening of a liquid level meter, and the openings are respectively provided with the corresponding meters therein.

As a further description of the above technical solution, an upper end of a shell of the hydrolysis and fermentation tank is also provided with a feed port. A feed pipe connected with the feed port is externally connected with the feed pump, and a plurality of return ducts are arranged outside the shell of the hydrolysis and fermentation tank.

As a further description of the above technical solution, the return ducts include three pipelines, and the other end of the pipelines each is connected to the anaerobic unit of the MSBR system.

As a further description of the above technical solution, an upper end of a shell of the hydrolysis and fermentation tank is provided with an overflow port, and a lower end of the shell is provided with a drain port configured to discharge digested and stabilized sludge.

As a further description of the above technical solution, the MSBR system is connected to the hydrolysis and fermentation tank through a pipe duct.

As a further description of the above technical solution, sludge is enriched through the pre-anoxic unit.

As a further description of the above technical solution, part of the enriched return sludge enters the hydrolysis and fermentation tank through the feed pump.

As a further description of the above technical solution, the sludge entering the hydrolysis and fermentation tank stays for 1 to 3 days.

As a further description of the above technical solution, the sludge-water separation unit, the pre-anoxic unit and the hydrolysis and fermentation tank are usable in combination with other activated sludge processes.

The present invention has the following beneficial effects:

1. By improving the multipoint influent distribution technique, the treatment capacity of the MSBR system in rainy season is improved to more than 400% to 500% of the design flow in dry season, which effectively avoids MSBR system breakdown caused by massive loss of activated sludge under overloaded water quantity conditions in rainy season.

2. The SBR units on two sides of the MSBR system are enabled to be in a settling-discharge state at the same time by adjusting the operation cycles. In this case, a settling region of the MSBR system can receive twice the solid load and hydraulic load than in the conventional operation mode.

3. By means of diversion, the present invention can prevent massive activated sludge from being brought into the settling region of the MSBR system, thereby reducing the inflow solid load of the settling region and avoiding massive sludge loss and unsatisfactory effluent quality.

4. The present invention can ensure the MSBR system to effectively treat the low-concentration heavy hydraulic impact load in rainy season, and restore the treatment capacity of the MSBR system for normal water concentration and water quantity after the water quantity drops.

5. By using the unique return sludge thickening function in the MSBR system, the return sludge is introduced into the sludge-water separation unit to be thickened, and then enriched in the pre-anoxic unit. Part of the enriched return sludge enters the hydrolysis and fermentation tank from the feed port through the feed pump and stays for 1 to 3 days, and is intermittently stirred inside the hydrolysis and fermentation tank by stirring blades of the stirrer, such that the mixture rich in rbCOD or SCVFAs returns to the anaerobic unit of the MSBR system through the return duct for addition of carbon sources. The anaerobic unit may perform intermittent stirring to enhance the utilization and proliferation of carbon sources by the activated sludge, thereby enhancing the nitrogen and phosphorus removal effect of the MSBR system.

6. By performing side stream hydrolysis (SSH) on the thickened sludge of the MSBR system, "internal carbon sources" in the thickened sludge are fully utilized, so that there is no need for addition of organic carbon sources such as glucose, sodium acetate and methanol, or addition of chemical phosphorus removal agents, which can achieve optimized nitrogen and phosphorus removal effect and stable operation of the MSBR system and reduce the operating cost.

7. The present invention can effectively solve the problems of insufficient carbon sources in influent and inefficient nitrogen and phosphorus removal of the MSBR system under large water quantity conditions in rainy season, fully utilize the internal carbon sources in the system, effectively reduce the cost of the sewage treatment plant and improve the operation stability and reliability of the MSBR system, thereby reducing the amount of sludge in the sewage treatment plant in situ and reducing the operation energy consumption on the premise of improving the nitrogen and phosphorus removal effect.

8. The device of the present invention has the return sludge thickening function. That is, the return sludge is introduced into the sludge-water separation unit to be thickened, and then enriched in the pre-anoxic unit. The device of the present invention also has the function of hydrolyzing and fermenting the thickened sludge, and can be used in combination with other activated sludge processes, thereby enhancing the nitrogen and phosphorus removal effect of the activated sludge process.

REFERENCE SYMBOLS

Figure 1:
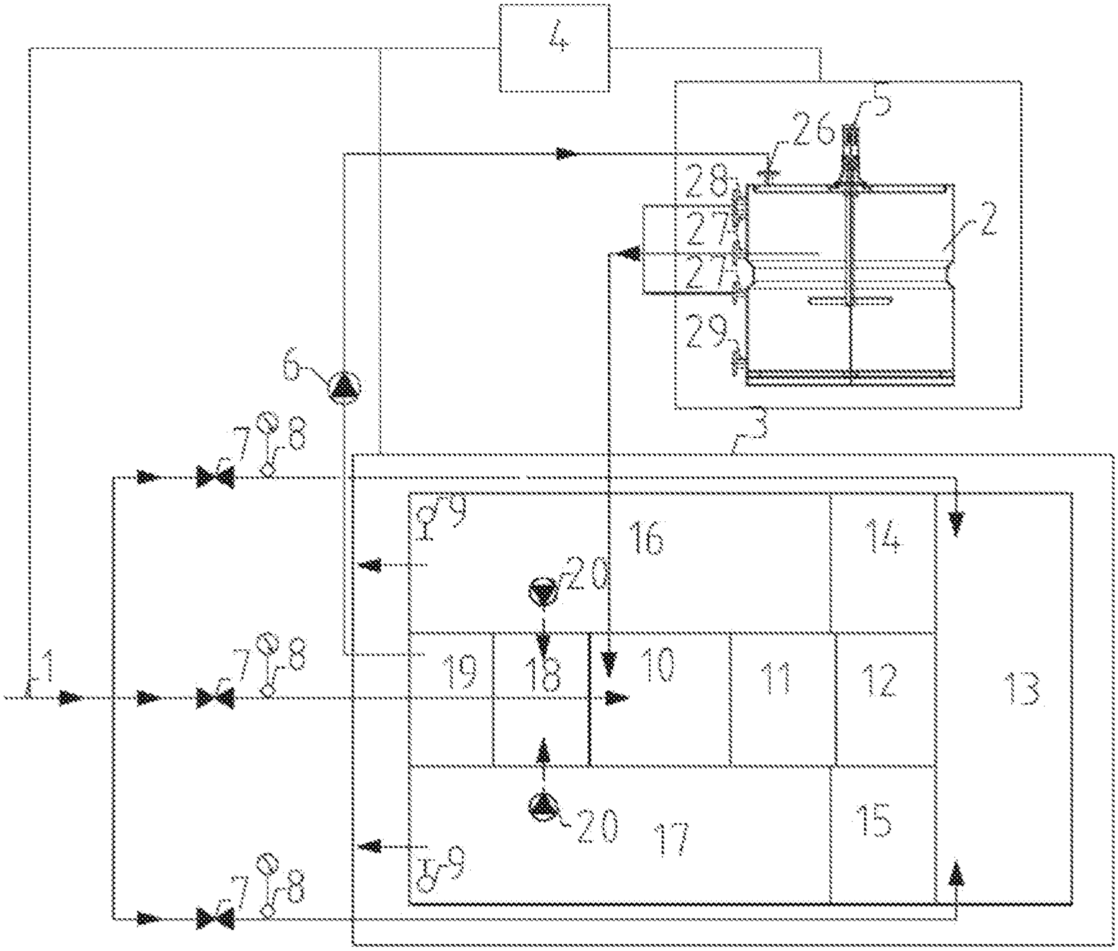
FIG. 1 is a schematic diagram of a device for influent distribution and thickened sludge fermentation to enhance an MSBR system according to the present invention.

1. influent distribution device; 2, hydrolysis and fermentation tank; 3, MSBR system; 4, online control platform; 5, stirrer; 6, feed pump; 7, electric ball valve; 8, electromagnetic flowmeter; 9, sludge concentration meter I; 10, anaerobic unit; 11, first anoxic unit; 12, second anoxic unit; 13, aerobic unit; 14, first anoxic/aerobic unit; 15, second anoxic/aerobic unit; 16, first SBR unit; 17, second SBR unit; 18, sludge-water separation unit; 19, pre-anoxic unit; 20, sludge return pump; 21, sludge concentration meter II; 22, ORP meter; 23, pH meter; 24, thermometer; 25, liquid level meter; 26, feed port; 27, return duct; 28, overflow port; 29, drain port.

DESCRIPTION OF THE EMBODIMENTS

The technical solutions in the embodiments of the present invention will be clearly and completely described below with reference to the accompanying drawings in the embodiments of the present invention. It is apparent that the described embodiments are only a part of the embodiments, rather than all of the embodiments of the present invention. All other embodiments obtained by those of ordinary skill in the art based on the embodiments of the present invention without creative work are within the protection scope of the present invention.

With reference to FIG. 1 to FIG. 5, in an embodiment according to the present invention, a device for influent distribution and thickened sludge fermentation to enhance an MSBR system includes an influent distribution device 1, a hydrolysis and fermentation tank 2 and an MSBR system 3 connected thereto. The influent distribution device 1, the hydrolysis and fermentation tank 2 and the MSBR system 3 are all connected to an external online control platform 4. The hydrolysis and fermentation tank 2 is provided with a stirrer 5 therein and configured to stir sludge entering the tank.

According to the above technical solution, under heavy hydraulic impact load conditions in rainy season, the influent distribution pipeline device 1 controls an influent flow speed through the electric ball valves 7, and measures a real-time influent flow rate through the electromagnetic flowmeters 8, thereby realizing reasonable control and distribution of the influent.

Rainwater in the initial stage contains a higher concentration of pollutants. As the water quantity increases to 1.5 times the design flow in dry season, the diluted rainwater starts to enter the system. At this time, a diversion mode of the system may be started.

Figure 2:
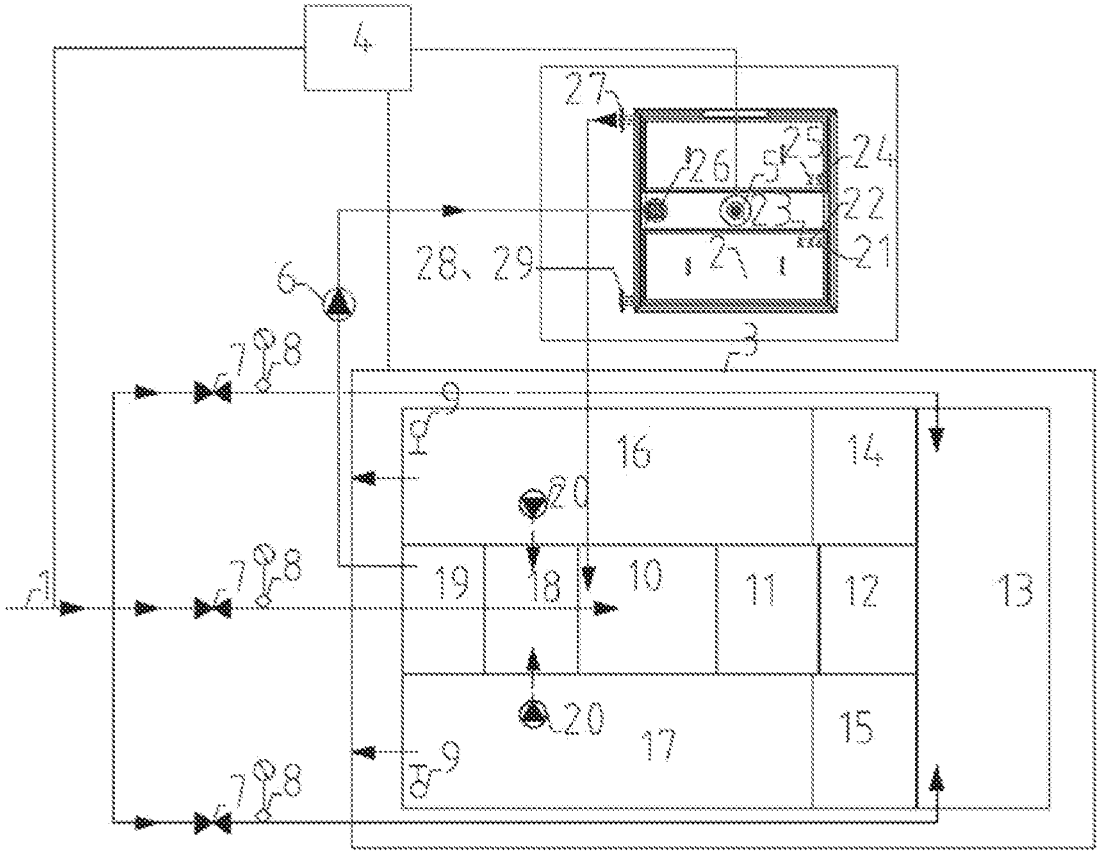
FIG. 2 is another schematic diagram of the device for influent distribution and thickened sludge fermentation to enhance an MSBR system according to the present invention.
Figure 3:
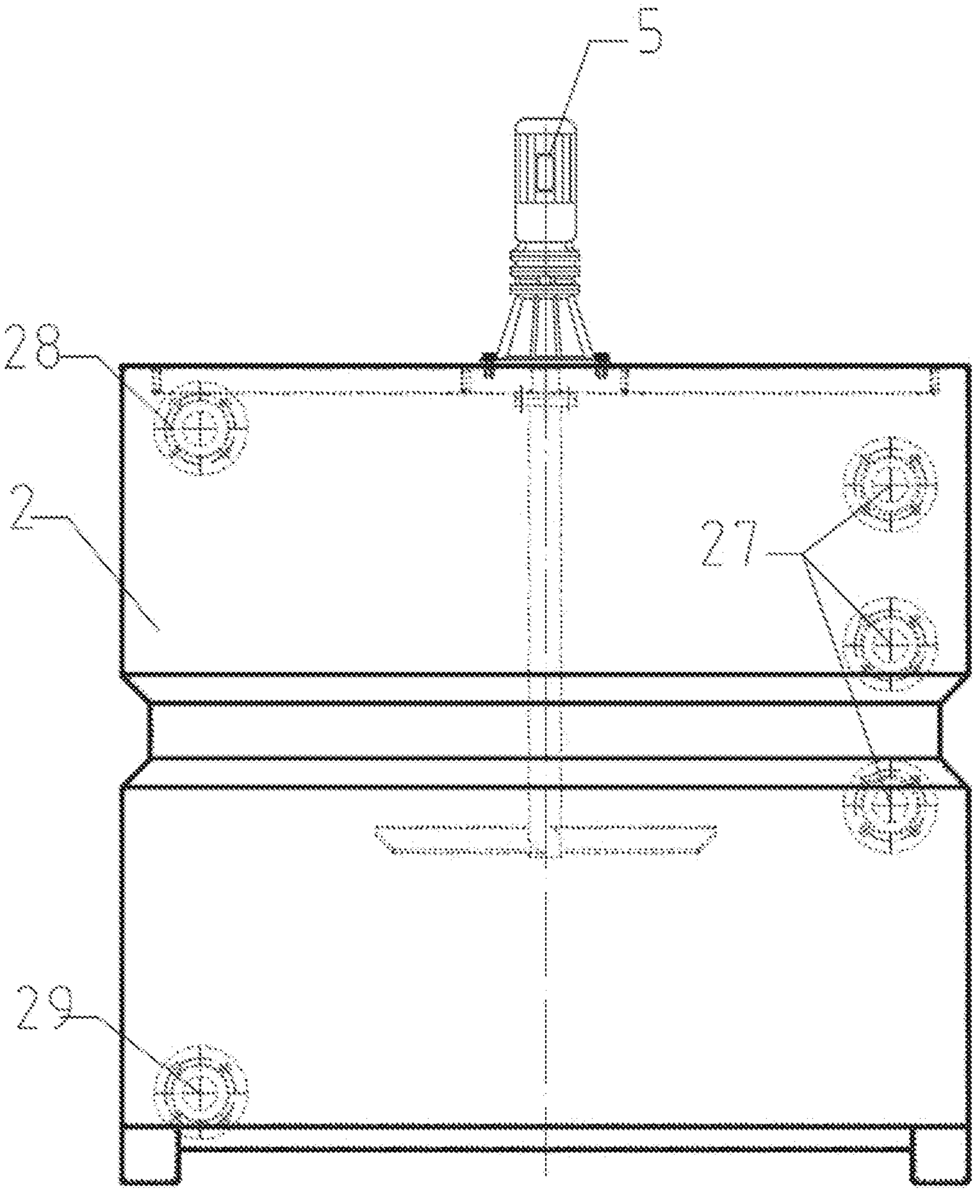
FIG. 3 is a side view of a hydrolysis and fermentation tank in the device for influent distribution and thickened sludge fermentation to enhance an MSBR system according to the present invention.
Figure 4:
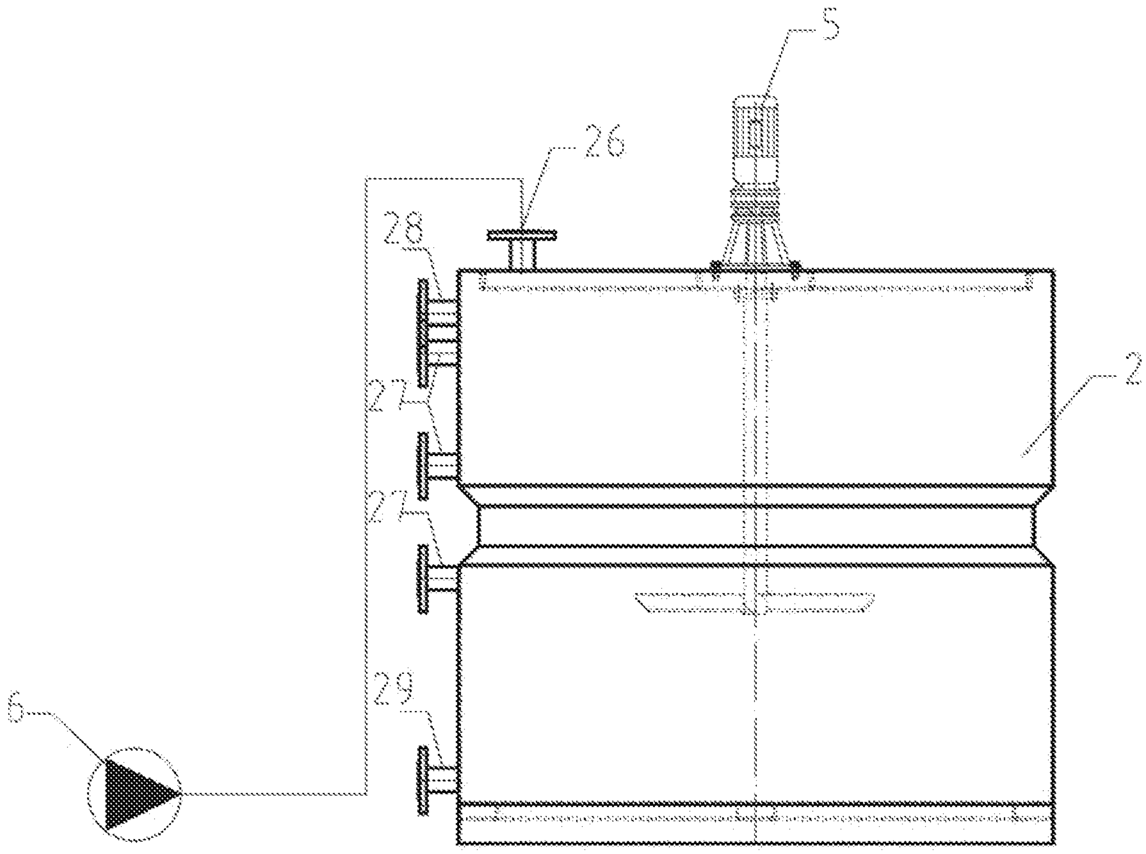
FIG. 4 is a front view of the hydrolysis and fermentation tank in the device for influent distribution and thickened sludge fermentation to enhance an MSBR system according to the present invention.
Figure 5:
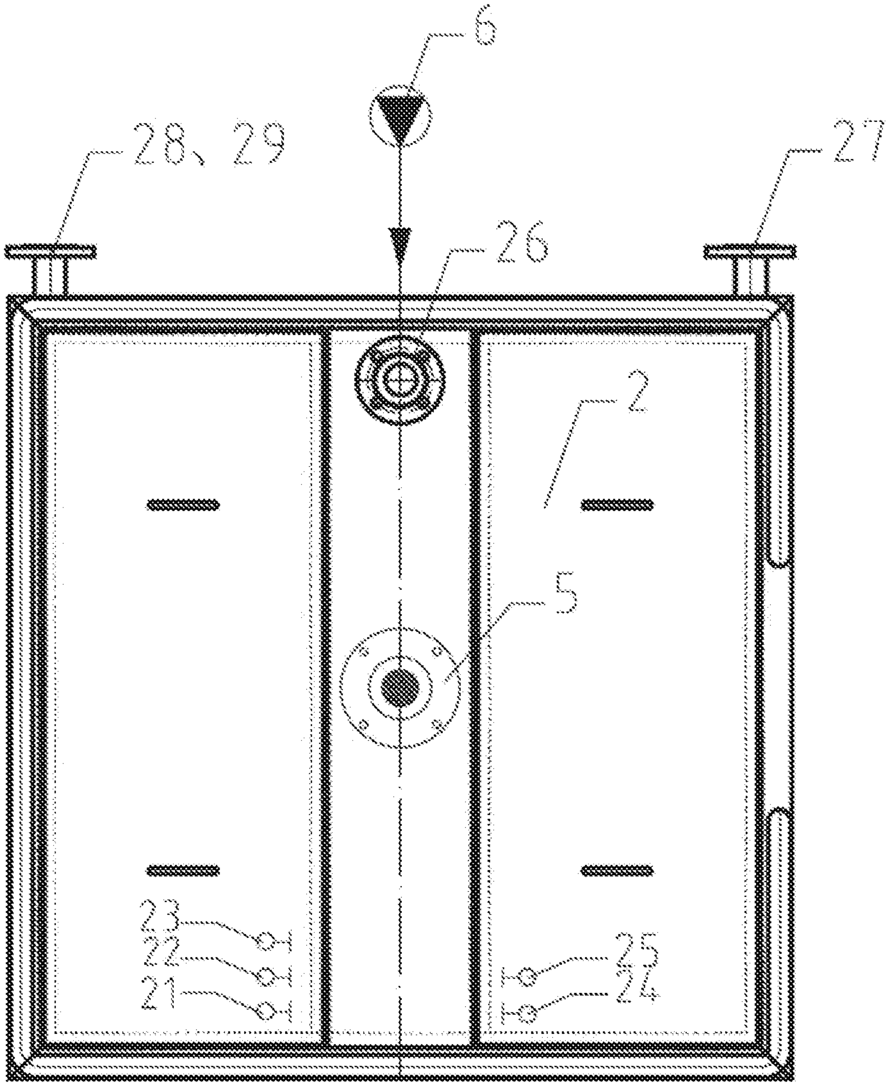
FIG. 5 is a top view of the hydrolysis and fermentation tank in the device for influent distribution and thickened sludge fermentation to enhance an MSBR system according to the present invention.

Referring to FIG. 1 and FIG. 2, the influent distribution pipeline device 1 conveys the influent respectively to head and tail regions of an anaerobic unit 10 and an aerobic unit 13. At this time, the water inflow of the anaerobic unit 10 is 1 to 1.5 times the design flow in dry season. After the influent is treated by the anaerobic unit 10, the mixture in the anaerobic unit 10 is conveyed to a first anoxic unit 11 and a second anoxic unit 12 for denitrification. The denitrified sewage enters the aerobic unit 13, where organic matters are degraded. The degraded sewage is subjected to enhanced nitrification and denitrification by a first anoxic/aerobic unit 14 and a second anoxic/aerobic unit 15, and conveyed to a first SBR unit 16 and a second SBR unit 17 for settling. The settled sludge is conveyed to a sludge-water separation unit 18 for separation and thickening. The thickened sludge is conveyed to a pre-anoxic unit 19 for further treatment, and then conveyed to the anaerobic unit 10 through a pipeline or to the hydrolysis and fermentation tank 2 through a sludge feed pump 6. At the same time, the sludge-water separation unit 18 conveys a thickened supernatant to the aerobic unit 13 for further reaction through a duct.

Further, the online control platform 4 enables the first SBR unit 16 and the second SBR unit 17 in the MSBR system 3 to be in a settling-discharge state at the same time by adjusting the operation cycles.

The remaining water distributed to the head and tail regions of the aerobic unit 13 by the influent distribution pipeline device 1 respectively returns sludge from the first SBR unit 16 and the second SBR unit 17 to the sludge-water separation unit 18 through a sludge return pump 20. Under the control of a VFD, sludge return is enhanced in a case of large flow rate in rainy season, thereby avoiding loss of sludge. Sludge concentration meters 9 are respectively arranged in the first SBR unit 16 and the second SBR unit 17 of the MSBR system and configured to monitor changes of sludge concentration and sludge layer height of the first SBR unit 16 and the second SBR unit 17 in the settling-discharge state, thereby performing flow distribution and adjustment of the amount of return sludge.

By using the unique return sludge thickening function in the MSBR system 3, the sludge in the MSBR system 3 is introduced by the sludge return pump 20 in the first SBR unit 16 and the second SBR unit 17 into the sludge-water separation unit 18 so as to be thickened, and then is enriched in the pre-anoxic unit 19. Part of the enriched return sludge enters the hydrolysis and fermentation tank 2 from the feed port 26 through the feed pump 6 and stays for 1 to 3 days, and is intermittently stirred inside the hydrolysis and fermentation tank 2 by stirring blades of the stirrer 5, such that the mixture rich in rbCOD or SCVFAs returns to the anaerobic unit 10 of the MSBR system 3 through the return duct 27 for addition of carbon sources, thereby enhancing the nitrogen and phosphorus removal effect of the MSBR system 3. The remaining digested and stabilized sludge may be discharged from a drain port 29 on the lower part of the hydrolysis and fermentation tank 2. Then, the discharged sludge is further treated, including drying and reuse, etc.

Further, a shell of the hydrolysis and fermentation tank 2 is provided with an opening of a sludge concentration meter II 21, an opening of an ORP meter 22, an opening of a pH meter 23, an opening of a thermometer 24 and an opening of a liquid level meter 25, and the openings are respectively provided with the corresponding meters therein. The above meters are respectively arranged at a position on an upper end of the hydrolysis and fermentation tank 2. The ORP meter 6 is configured to detect an ORP (oxidation-reduction potential) in the hydrolysis and fermentation tank 2. The pH meter 23 is configured to monitor a pH of the mixture. The thermometer 24 and the liquid level meter 25 are configured to monitor a temperature and a liquid level of the mixture.

All data obtained by the above meters are monitored through the online control platform 4. The online control platform 4 may control and monitor the above equipment and meters, and control the setting of related parameters such as the operation cycle of the MSBR system 3.

Further, key parameters affecting the activated sludge hydrolysis process and efficiency include temperature, SRT, MLSS, pH, fermentor mixing conditions, etc. The sludge hydrolysis rate is linearly related to the sludge concentration in a certain range when other conditions are constant. Compared with the sludge concentration of the conventional activated sludge for hydrolysis of about 3000 mg/L, the feed concentration of thickened sludge of the MSBR system can usually reach 8000 to 12000 mg/L. Therefore, a combination of the MSBR system 3 and the hydrolysis and fermentation tank 2 can greatly increase the hydrolysis rate of the sludge hydrolysis and fermentation device, and can at least double the concentration of rbCOD or SCVFAs generated by hydrolysis within the same time. This can also avoid too long sludge retention time (SRT) of the hydrolysis and fermentation device, causing the anaerobic hydrolysis process of the activated sludge to enter the methanogenic phase, and also avoid a too large device volume.

Further, an upper end of a shell of the hydrolysis and fermentation tank 2 is also provided with a feed port 26. A feed pipe connected with the feed port 26 is externally connected with the feed pump 6, and a plurality of return ducts 27 are arranged outside the shell of the hydrolysis and fermentation tank 2. Part of the enriched return sludge enters the hydrolysis and fermentation tank 2 from the feed port 26 through the feed pump 6. The feed port 26 is arranged on the upper part of the hydrolysis and fermentation tank 2, so that a larger volume of return sludge can be introduced into the tank.

Further, the return ducts 27 include three pipelines, and the other end of the pipelines each is connected to the anaerobic unit 10 of the MSBR system 3, so that the mixture containing rbCOD or SCVFAs can return to the anaerobic unit in the MSBR system 3 through the plurality of return ducts 27 for addition of carbon sources in the MSBR system 3, thereby enhancing the nitrogen and phosphorus removal effect.

Further, after the stabilized return sludge is discharged from the drain port 29 which is configured to discharge digested and stabilized sludge, the increase of the return sludge may be adjusted correspondingly according to the values monitored by the ORP meter 22 and the pH meter 23, thereby ensuring the best sludge hydrolysis and fermentation rate.

Further, the MSBR system 3 is connected to the hydrolysis and fermentation tank 2 through a pipe duct, and the MSBR system 3 and the hydrolysis and fermentation tank 2 may also be built together, which can reduce the volume of the whole device.

Further, the sludge is enriched through a pre-anoxic unit 19.

Further, part of the enriched return sludge enters the hydrolysis and fermentation tank 2 through the feed pump 6.

Further, the sludge entering the hydrolysis and fermentation tank 2 stays for 1 to 3 days, preferably, 2 days. This can greatly increase the content of rbCOD or SCVFAs separated from the sludge, and so that sufficient carbon sources can be added at one time.

Further, the sludge-water separation unit 18, the pre-anoxic unit 19 and the hydrolysis and fermentation tank 2 may be used in combination with other activated sludge processes to hydrolyze and ferment the thickened and enriched return sludge, thereby realizing addition of carbon sources.

Finally, it should be noted that the above is only preferred embodiments of the present invention and is not intended to limit the present invention. Although the present invention has been described in detail with reference to the foregoing embodiments, those skilled in the art can still modify the technical solutions described in the foregoing embodiments or make equivalent substitutions to part of the technical features. Any modification, equivalent substitution, improvement, etc. made within the spirit and principle of the present invention shall fall within the protection scope of the present invention.

What is claimed is:

1. A device for influent distribution and thickened sludge fermentation to enhance an MSBR system, comprising an influent distribution device, a hydrolysis and fermentation tank and an MSBR system connected thereto, wherein the influent distribution device, the hydrolysis and fermentation tank and the MSBR system are all connected to an external online control platform; and the influent distribution device comprises a distribution pipeline and related valves and meters and is configured to distribute a water inflow of the MSBR system, the hydrolysis and fermentation tank is provided with a stirrer therein and configured to stir sludge entering the tank, and the hydrolysis and fermentation tank is externally connected with a feed pump and configured to input sludge in the MSBR system into the tank;

wherein the MSBR system further comprises a sludge-water separation unit, a pre-anoxic unit, an anaerobic unit, a first anoxic unit and a second anoxic unit that are sequentially connected;

wherein an upper end of a shell of the hydrolysis and fermentation tank is also provided with a feed port, a feed pipe connected with the feed port is externally connected with the feed pump, and a plurality of return ducts are arranged outside the shell of the hydrolysis and fermentation tank;

and wherein the return ducts comprise three pipelines, and the other end of the pipelines each is connected to the anaerobic unit of the MSBR system.

2. The device for influent distribution and thickened sludge fermentation to enhance an MSBR system of claim 1, wherein the influent distribution device comprises: three pipelines, a middle part of each pipeline being provided with an electromagnetic flowmeter;

electric ball valves, each mounted at a water inlet at a front end of the electromagnetic flowmeter; and sludge concentration meters I.

3. The device for influent distribution and thickened sludge fermentation to enhance an MSBR system of claim 2, wherein the MSBR system comprises an anaerobic unit, an aerobic unit, a first SBR unit and a second SBR unit; a bottom of the anaerobic unit is provided with a water inlet, the water inlet being connected to a middle pipeline of the influent distribution device; and a bottom of the aerobic unit is also provided with a water inlet, the water inlet being connected to two side pipelines of the influent distribution device.

4. A device for influent distribution and thickened sludge fermentation to enhance an MSBR system of claim 3, wherein the sludge concentration meters I are respectively arranged inside the first SBR unit and the second SBR unit, and the first SBR unit and the second SBR unit are respectively connected with a sludge return pump.

5. The device for influent distribution and thickened sludge fermentation to enhance an MSBR system of claim 3, wherein the second anoxic unit is connected to the aerobic unit; and the first SBR unit, the second SBR unit and the sludge-water separation unit are connected through the sludge return pump, and a first anoxic/aerobic unit and a second anoxic/aerobic unit are connected to the aerobic unit.

6. The device for influent distribution and thickened sludge fermentation to enhance an MSBR system of claim 5, wherein sludge is enriched through the pre-anoxic unit.

7. The device for influent distribution and thickened sludge fermentation to enhance an MSBR system of claim 6, wherein part of the enriched return sludge enters the hydrolysis and fermentation tank through the feed pump.

8. The device for influent distribution and thickened sludge fermentation to enhance an MSBR system of claim 5, wherein the sludge-water separation unit, the pre-anoxic unit and the hydrolysis and fermentation tank are usable in combination with other activated sludge processes.

9. The device for influent distribution and thickened sludge fermentation to enhance an MSBR system of claim 1, wherein a shell of the hydrolysis and fermentation tank is provided with an opening of a sludge concentration meter II, an opening of an ORP meter, an opening of a pH meter, an opening of a thermometer and an opening of a liquid level meter, and the openings are respectively provided with the corresponding meters therein.

10. The device for influent distribution and thickened sludge fermentation to enhance an MSBR system of claim 1, wherein an upper end of a shell of the hydrolysis and fermentation tank is provided with an overflow port, and a lower end of the shell is provided with a drain port configured to discharge digested and stabilized sludge.

11. The device for influent distribution and thickened sludge fermentation to enhance an MSBR system of claim 10, wherein the sludge entering the hydrolysis and fermentation tank stays for 1 to 3 days.

12. The device for influent distribution and thickened sludge fermentation to enhance an MSBR system of claim 1, wherein the MSBR system is connected to the hydrolysis and fermentation tank through a pipe duct.

* * * * *